(12) United States Patent
March et al.

(10) Patent No.: US 8,573,910 B2
(45) Date of Patent: *Nov. 5, 2013

(54) HIGH PERFORMANCE SLEEVED INTERFERENCE FASTENERS FOR COMPOSITE APPLICATIONS

(75) Inventors: Michael U. March, Torrance, CA (US); Oviedo Arciniega, Perris, CA (US)

(73) Assignee: Alcoa Inc., Pittsburgh, PA (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/732,396

(22) Filed: Mar. 26, 2010

(65) Prior Publication Data

US 2010/0278616 A1  Nov. 4, 2010

Related U.S. Application Data

(63) Continuation of application No. 11/533,964, filed on Sep. 21, 2006, now Pat. No. 7,695,226.

(51) Int. Cl.
*F16B 13/00* (2006.01)

(52) U.S. Cl.
USPC ................................ 411/43; 411/69; 411/361

(58) Field of Classification Search
USPC ...................... 411/43, 69, 339, 361
See application file for complete search history.

(56) References Cited

U.S. PATENT DOCUMENTS

| | | |
|---|---|---|
| 2,396,661 A | 1/1944 | Keller et al. |
| 2,501,567 A | 3/1950 | Huck |
| 2,940,767 A | 6/1960 | Goodner |
| 3,041,912 A | 7/1962 | Krieder et al. |
| 3,215,024 A | 10/1964 | Brilmyer |
| 3,271,058 A | 9/1966 | Anderson |
| 3,304,109 A | 2/1967 | Schuster |

(Continued)

FOREIGN PATENT DOCUMENTS

| | | |
|---|---|---|
| EP | 0 248 122 A2 | 9/1987 |
| EP | 0 468 563 | 1/1992 |
| JP | 7151111 A | 6/1995 |
| WO | 8705976 | 10/1987 |

OTHER PUBLICATIONS

International Search Report and Written Opinion issued in connection with assignee's International Patent Application No. PCT/US2010/053342 entitled "Enhanced Conductivity Sleeved Fastener and Method for Making Same" (11 pages).

(Continued)

*Primary Examiner* — Flemming Saether
(74) *Attorney, Agent, or Firm* — Greenberg Traurig, LLP (57) ABSTRACT

A fastener adapted to pass through aligned holes through workpieces is disclosed. The fastener includes a pin member having a transition portion wherein the diameter of the transition portion decreases radially as it extends from the smooth cylindrical shank portion to the threaded portion. The fastener may also comprise a sleeve member and a clamping means. The clamping means includes a collar, a nut, or any other possible clamping means. In exemplary embodiments, the workpieces can be formed with a plurality of materials, the materials including composite, metallic, or composite/metallic structures, any combination thereof. In particular embodiments, the fastener has interference capability of 0.0005 to 0.0100 inches in composite structures without risk of composite delamination or damage. As a result of the fastener interference, gaps between the fastener and the structure are eliminated thereby providing good electrical conductivity between components. As a result, the potential for electrical sparks is reduced, providing a safer fastener for use with aerospace applications.

14 Claims, 7 Drawing Sheets

(56) References Cited

U.S. PATENT DOCUMENTS

| | | |
|---|---|---|
| 3,464,306 A | 9/1969 | Reynolds et al. |
| 3,535,911 A | 10/1970 | Armstrong |
| 3,792,933 A | 2/1974 | Stencel |
| 3,820,297 A | 6/1974 | Hurd |
| 3,835,615 A | 9/1974 | King |
| 3,915,052 A | 10/1975 | Ruhl |
| 3,949,535 A | 4/1976 | King, Jr. |
| 3,953,906 A | 5/1976 | Brown |
| 3,965,792 A | 6/1976 | King, Jr. |
| 4,048,898 A | 9/1977 | Salter |
| 4,102,030 A | 7/1978 | King, Jr. |
| 4,164,807 A | 8/1979 | King, Jr. |
| 4,244,661 A | 1/1981 | Dervy |
| 4,405,256 A | 9/1983 | King, Jr. |
| 4,472,096 A | 9/1984 | Ruhl et al. |
| 4,479,163 A | 10/1984 | Bannink, Jr. et al. |
| 4,502,092 A | 2/1985 | Bannink, Jr. et al. |
| 4,557,033 A | 12/1985 | Champoux |
| 4,628,402 A | 12/1986 | Covey |
| 4,702,655 A | 10/1987 | Kendall |
| 4,755,904 A | 7/1988 | Brick |
| 4,760,493 A | 7/1988 | Pearson |
| 4,789,283 A | 12/1988 | Crawford |
| 4,813,834 A | 3/1989 | Smith et al. |
| 4,850,771 A | 7/1989 | Hurd |
| 4,867,625 A | 9/1989 | Dixon |
| 4,891,732 A | 1/1990 | Jones |
| 4,905,931 A | 3/1990 | Covey |
| 4,943,196 A | 7/1990 | Dahl |
| 5,018,920 A | 5/1991 | Speakman |
| 5,129,253 A | 7/1992 | Austin et al. |
| 5,176,481 A | 1/1993 | Schiefer |
| D372,857 S | 8/1996 | Hirai |
| 6,149,363 A | 11/2000 | March |
| 6,499,926 B2 | 12/2002 | Keener |
| 6,589,918 B2 | 7/2003 | Denpo et al. |
| 6,659,699 B2 | 12/2003 | Stoewer et al. |
| 6,665,922 B2 | 12/2003 | Schultz |
| 7,050,286 B2 | 5/2006 | Pridham et al. |
| 7,236,343 B2 | 6/2007 | Heidlebaugh et al. |
| 7,277,266 B1 | 10/2007 | Le et al. |
| 7,307,825 B2 | 12/2007 | De La Fuente De Ana et al. |
| 7,326,015 B2 | 2/2008 | Reynolds, Jr. |
| 7,525,785 B2 | 4/2009 | Rawlings |
| 7,554,785 B2 | 6/2009 | Hawley |
| 7,599,164 B2 | 10/2009 | Heeter et al. |
| 7,721,990 B2 | 5/2010 | Jaeger et al. |
| 7,738,236 B2 | 6/2010 | Stein |
| 7,755,876 B2 | 7/2010 | Morrill et al. |
| 7,869,181 B2 | 1/2011 | Le |
| 7,898,785 B2 | 3/2011 | Winter et al. |
| 2002/0119028 A1 | 8/2002 | Brown et al. |
| 2004/0091331 A1 | 5/2004 | Schultz |
| 2005/0144874 A1 | 7/2005 | West et al. |
| 2007/0041143 A1 | 2/2007 | Georgeson et al. |
| 2007/0111909 A1 | 5/2007 | Combetta |
| 2007/0177330 A1 | 8/2007 | Ackerman et al. |
| 2008/0240925 A1 | 10/2008 | Kita et al. |
| 2009/0060666 A1 | 3/2009 | Georgeson et al. |
| 2009/0159306 A1 | 6/2009 | Loche et al. |
| 2009/0178262 A1 | 7/2009 | Reid et al. |
| 2010/0124472 A1 | 5/2010 | Nguyen et al. |
| 2010/0219287 A1 | 9/2010 | Sanchez-Brunete Alvarez et al. |
| 2010/0260572 A1 * | 10/2010 | Wehrmeister et al. .......... 411/43 |
| 2010/0272537 A1 | 10/2010 | Haylock et al. |
| 2010/0276536 A1 | 11/2010 | Lambert et al. |
| 2010/0277849 A1 | 11/2010 | Morrill et al. |
| 2011/0056718 A1 | 3/2011 | Gattus et al. |

OTHER PUBLICATIONS

International Search Report and Written Opinion for International Patent Application No. PCT/US07/78775 (7 pages), Oct. 22, 2008.

International Search Report and Written Opinion for International Patent Application No. PCT/US2010/029758 (12 pages), Sep. 7, 2010.

Notice of Opposition of European Patent Application No. 07116776.1, including English-language translation, filed Jan. 6, 2012.

ASTM International, "Standard Guide for Measuring and Reporting Friction Coefficients", Nov. 2008, pp. 1-12.

Huck International, Inc. "Huck Aerospace Fasteners for Composite Structure", © 1992.

"Guide d'emploi des traitements de surfaces appliqués aux problémes de frottement", including its English-language translation, © Technique and Documentation, 2000.

Huck Manufacturing Company, "Lightweight (GP) Interference Fit Fastener for Composite Materials", Apr. 1984.

Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.

Rockwell International, Space Systems Division, "Preload Measurement in Sleeve Bolts Using an Ultrasonic Technique", Feb. 1996, by Ajay Koshti.

Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.

Wroclow University of Technology, Department of Mechanical Engineering, "The Statistical Correlation of the Coefficient of Friction and Wear Rate of PTFE Composites with Steel Counterface Roughness and Hardness", Wojciech Wielaba, 2002.

* cited by examiner

HIGH PERFORMANCE SLEEVED INTERFERENCE FASTENERS FOR COMPOSITE APPLICATIONS

RELATED APPLICATIONS

The present application is a continuation of U.S. patent application Ser. No. 11/533,964 entitled HIGH PERFORMANCE SLEEVED INTERFERENCE FASTENERS FOR COMPOSITE APPLICATIONS, filed on Sep. 21, 2006 now U.S. Pat. No. 7,695,226, the entire disclosure of which is incorporated by reference herein.

BACKGROUND

1. Field

The present disclosure relates to an improved threaded fastener and method for securing workpieces of composite materials. In particular embodiments, the present disclosure relates to a fastener including a pin and a preformed sleeve which may be placed around the pin for use in interference applications.

2. General Background

More and more graphite composite materials are being incorporated into aircraft structures. Use of graphite composites increase strength, increase life, reduce weight, reduce fuel consumption, increase payload, among other benefits. However, as these newer materials are utilized, new challenges need to be overcome in fastening technology when compared to typical metallic structures.

Existing aerospace fasteners cannot be safely installed in interference conditions in graphite or mixed graphite-composite metallic structures. Typically, clearance fit fasteners are utilized to avoid concerns of composite delamination and potential structural failure that make these fasteners unsafe to utilize. As a result, fasteners are installed in clearance holes that result in the reduction of dynamic joint performance, gaps in the structure, and other structural concerns.

The resulting gap between the fastener shank portion and hole prevent uniform contact of structural components. Consequently, safe dissipation of lightning strike current/energy, and electro-magnetic currents is a major concern. Currently, aircraft manufacturers are resorting to elaborate, expensive, and sometimes risky alternative methods to properly ground the structure. For example, copper, or another low conductive strip, may be incorporated onto the surface of the workpieces to provide a preferential low resistance path for any current. Additionally, a film adhesive containing a conductive fiber carrier film capable of conducting high currents between two workpieces may be utilized. However, both of these methods are very expensive and not a cost effective way to provide safe dissipation of current.

Additionally, prior fasteners cannot be installed with significant amounts of sealant, as is required in most aircraft structures. If sufficient sealant is utilized during installation, the coefficient of friction between the fastener assembly and the workpieces is reduced hindering installation capability. Additionally, there is an inability to flow any excess sealant out of the joint.

Further, previous pins with mating sleeves manufactured for interference applications are only capable of being installed in 100% graphite composite materials. In addition, these fasteners are limited to applications of short lengths and small diameters. Prior fasteners cannot be installed in any composite/metallic structures and most 100% percent composite structures.

Additionally, previous fasteners for interference applications are only available in shear load range strength capabilities. The collars utilized in these fasteners are typically commercially pure titanium and subject to creep at fairly low elevated temperatures.

Thus, there is a need to provide a fastener that allows for interference applications without the possibility of delamination and structural failure.

There is also a need to provide a fastener that may be used in a variety of different applications. Utilization of a fastener in a variety of composite/metallic structures is needed.

Additionally, there is a need to provide fasteners which provide safe dissipation of electrical currents caused by lightning strikes and/or static electricity. Fasteners that allow for uniform contact of the structural components will provide the necessary dissipation and a safer, more cost effective solution to the problems involving electrical currents.

SUMMARY

In one aspect of the present disclosure, a fastener is disclosed having a pin. The pin member includes an elongated smooth cylindrical shank portion and an enlarged head for mating with the sleeve. In some embodiments, there is a countersink or protruding head for engagement with a flared end of the sleeve. The pin member also includes a threaded portion and a frangible portion axially aligned with the smooth cylindrical shank portion. The frangible portion includes a pull groove portion having circumferential pull grooves adapted to be gripped for applying a relative axial force to pull the pin member into the sleeve. The pin member includes a breakneck groove between the threaded portion and the frangible portion. As the fastener is installed, the frangible portion is separated at the breakneck groove.

The pin includes a transition portion between the smooth cylindrical shank portion and the treaded portion designed and optimized to minimize the installation force required for the high interference conditions resulting from installation. In exemplary embodiments, the transition portion may be tapered and have an angle less than or equal to 20 degrees from the pin shank. In other embodiments, the transition portion reduces the radial diameter of the pin shank between 0.004 to about 0.005 inches over a distance of 0.010 to 0.290 inches between the smooth portion and the threaded portion.

In other embodiments, the fastener further comprises a sleeve and a clamping means to secure together workpieces. The clamping means may comprise a collar or nut member or any other means suitable to fasten the workpieces together with the pin and sleeve. The fastener is installed through aligned holes located in two or more workpieces. In some embodiments, one of the holes through the workpieces includes a countersink, or lead in radius, on its outer opening.

The sleeve, adapted to fit over the smooth cylindrical shank portion, includes a tubular portion and an enlarged end for engagement with the outer surface of the workpiece. In some embodiments, there is a flared end for engagement with the countersink portion in the workpieces. The sleeve has a length greater than the maximum total thickness of the workpieces to be joined at the location of the aligned holes. The tubular portion of the sleeve has an inner diameter less than the diameter of the smooth cylindrical shank portion and an outer diameter sized to permit fitting of the sleeve into the aligned clearance holes of the workpieces.

In one aspect, the pin member has a smooth cylindrical shank portion with a diameter greater than the maximum inner diameter of the sleeve. When the smooth cylindrical shank portion enters into and pulls through the sleeve, the sleeve radially expands into an interference fit with the walls of the holes of the workpieces.

The tubular collar member is adapted to be fit over the threaded portion of the pin member including a counterbore to enable the collar to provide clearance over the sleeve, and an annular flange portion at one end for engagement with the other outer surface of the workpieces. The collar member includes an enlarged cylindrical shank portion having a uniform outside diameter adapted to be swaged into the threaded portion of the pin.

In another embodiment, the nut member is adapted to fit the threaded portion of the pin member including a counterbore to enable the nut member to provide clearance over the sleeve, and an annular flange portion at one end for engagement with the other outer surface of the workpieces. The nut member includes a threaded portion to be threaded onto the threaded portion of the pin to secure the fastener to the workpieces.

In another aspect, the sleeve member includes lubrication on the inner diameter surface to reduce friction as the pin smooth cylindrical shank portion enters the sleeve. The outer diameter surface of the sleeve and/or the inner diameter of the aligned holes has a rougher surface. In particular embodiments, the coefficient of friction between the inner surface of the sleeve and the smooth cylindrical shank portion of the pin member is less than the coefficient of friction between the outer surface of the sleeve and inner diameter of the holes, allowing the sleeve to expand radially upon insertion of the smooth cylindrical shank portion of the pin member to be in an interference fit.

In a further aspect, a fastener is disclosed that has the capability of being installed in composite, metallic, or composite/metallic structures. For example, the disclosed fastener could be installed in, for example, graphite composites, titanium, aluminum, or a mixture of these components.

In another aspect, as a result of the fastener interference, gaps between the fastener and the structure are eliminated thereby providing good electrical conductivity between components. As a result, the potential for electrical sparks is reduced, providing a safer fastener for use with aerospace applications.

In another aspect, the fastener has interference capability of 0.0005 to 0.0100 inches in composite and/or metallic structures without risk of composite delamination or damage.

In an additional aspect of the present disclosure, the fastener has a functional grip capability of about 0.062 to about 0.140 inches.

Other objects, features, and advantages of the present disclosure will become apparent from the subsequent description and the appended claims, taken in conjunction with the accompanying drawings

DRAWINGS

The foregoing aspects and advantages of present disclosure will become more readily apparent and understood with reference to the following detailed description, when taken in conjunction with the accompanying drawings, wherein.

DETAILED DESCRIPTION

A fastener for securing together a plurality of workpieces 105, 110 and adapted to be located in aligned holes 125, 130 in such workpieces is disclosed. In exemplary embodiments, the fastener 10 includes a pin member 15, a sleeve member 20 and a collar 200. In other embodiments, the fastener may include a nut instead of a collar. In exemplary embodiments, the workpieces 105, 110 can be formed with a plurality of materials, the materials including composite, metallic, or composite/metallic structures, or any combination thereof. In particular embodiments, the workpieces 105, 110 may be constructed from titanium, aluminum, graphite composites, or any combination thereof.

Figure 1:
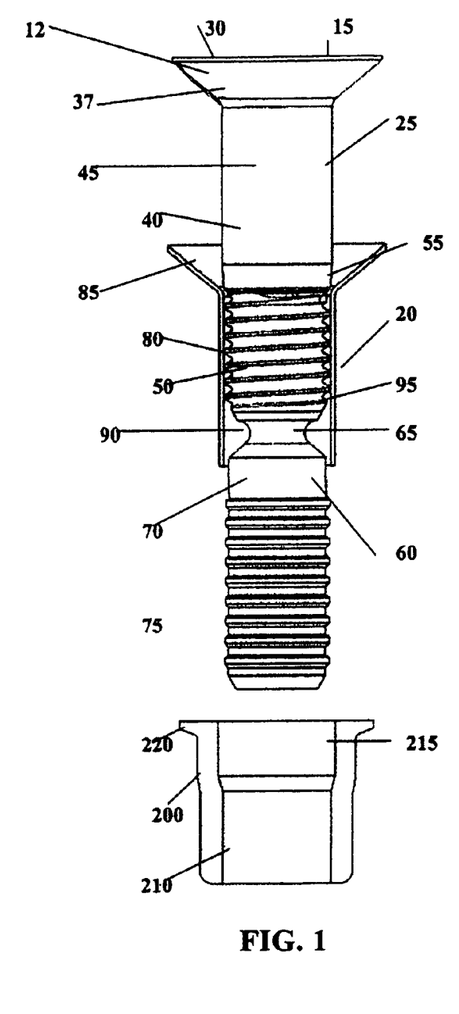
FIG. 1 illustrates an exemplary embodiment of the fastener showing the pin and the sleeve of the fastener, the pin having an enlarged flush head.
Figure 2:
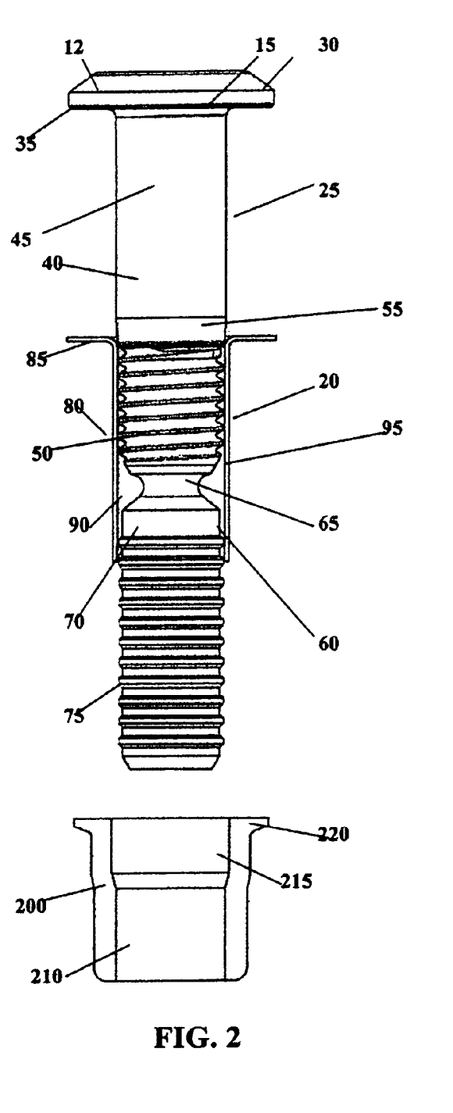
FIG. 2 illustrates another exemplary of the fastener showing the pin and the sleeve of the fastener, the pin having an enlarged protruding head

An embodiment of the pin and sleeve assembly 12 is shown in FIGS. 1 and 2. The pin member 15 includes an elongated shank portion 40 which terminates at one end 30 with an enlarged flush head 37 or protruding head 35. The pin shank portion 40 includes a substantially smooth cylindrical portion 45, a threaded portion 50, and a frangible portion 60. The smooth cylindrical shank portion extends from the head 35, 37 and is adapted to be received by the expansion sleeve 20. Following the substantially smooth cylindrical portion 45 is a threaded portion 50. The threaded portion 50 is generally uniformly threaded throughout its length. A tapered transition portion 55 smoothly merges the threaded portion 50 with the smooth cylindrical shank portion 45.

The frangible portion 60 of the pin member 15 extends from the threaded portion 50. The frangible portion 60 includes a cylindrical land 70 and a pull groove portion 75 having circumferential pull grooves 75. A breakneck groove 65 that is located adjacent to the threaded portion 50 and defines the weakest portion of the fastener 10.

In some embodiments, the threaded portion 50, breakneck groove 65, straight land 70 and pull groove portion 75 has a maximum diameter which is less than the diameter of the smooth cylindrical portion 45 of the shank portion, the straight land portion 70 having a diameter smaller than that of the threaded portion 50 and pull groove portion 75.

In this embodiment, the expansion sleeve member 20 has a generally uniform tubular portion 80 that terminates in an enlarged flanged shaped head 85 to receive the flush head 37 or protruding head 35 of the pin member 15. The sleeve 20 has an internal diameter that is greater than the threaded portion 50 and frangible portions 60 of the pin 15, but less than the diameter of the smooth cylindrical shank portion 45.

The inner diameter of the sleeve member 20 includes a low friction coating on its surface 90 to facilitate movement of the pin member 15 into the sleeve 20 during installation. In a particular embodiment, the sleeve member 20 is coated with low friction coating to eliminate the resistance between the smooth cylindrical shank portion 45 of the pin member 15 and the inner diameter surface 90 of the sleeve tubular portion 80. The low friction coating on the inner diameter of the sleeve allows the pin member 15 to slide through the sleeve member 20 easier due to reduced frictional loading.

Additionally, the coating on the inside diameter surface 90 enables the installation of the fastener to function when fasteners are installed with minimum, moderate, or heavy amounts of sealant on the fastener and in the installed joint.

Figure 3:
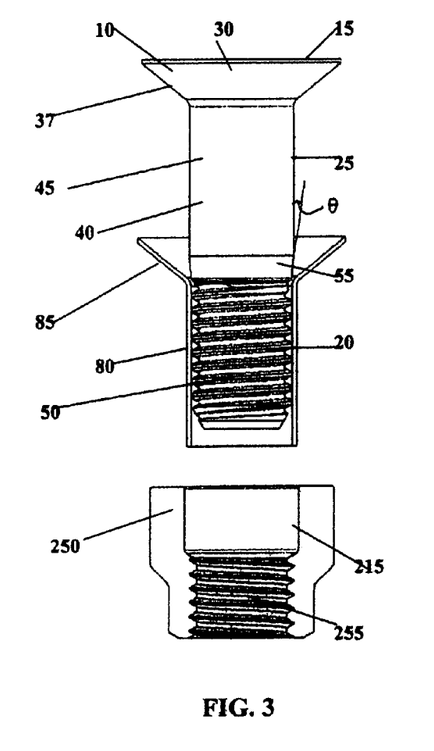
FIG. 3 illustrates another embodiment of the fastener showing the pin and the sleeve of the fastener, the pin having a longer threaded area and no frangible portion and an enlarged flush head.
Figure 4:
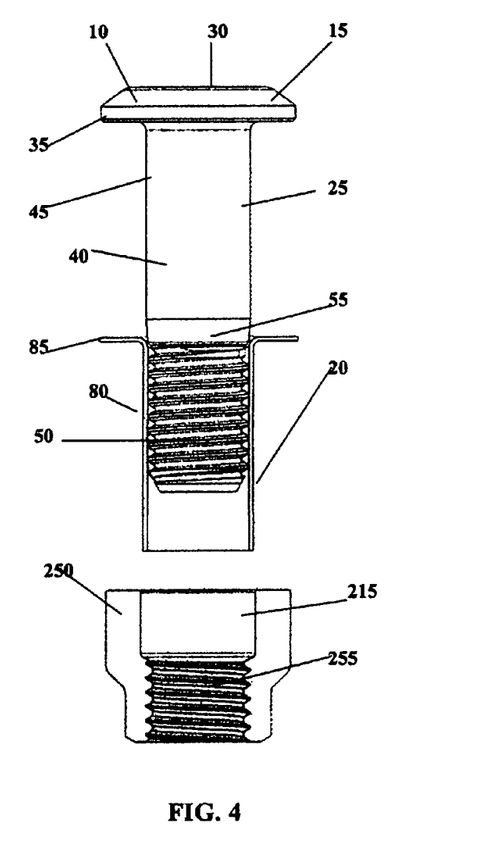
FIG. 4 illustrates another embodiment of the fastener showing the pin and sleeve of the fastener, the pin having an enlarged protruding head.

Another embodiment of the fastener is illustrated in FIG. 3 and FIG. 4. In this embodiment, the pin member 15 includes an elongated shank portion 40 which terminates at one end 30 with an enlarged head 35, 37. This embodiment may also have a protruding head 37 as shown in the embodiment in FIG. 2. The pin shank portion 40 includes a substantially smooth cylindrical portion 45, a threaded portion 50, but does not include a frangible portion. The smooth cylindrical shank portion extends from the head 35, 37 and is adapted to be received by the expansion sleeve 20. Following the substantially smooth cylindrical portion 45 is a threaded portion 50. The threaded portion 50 is generally uniformly threaded throughout its length. A tapered transition portion 55 smoothly merges the threaded portion 50 with the smooth cylindrical shank portion 45.

Figure 5:
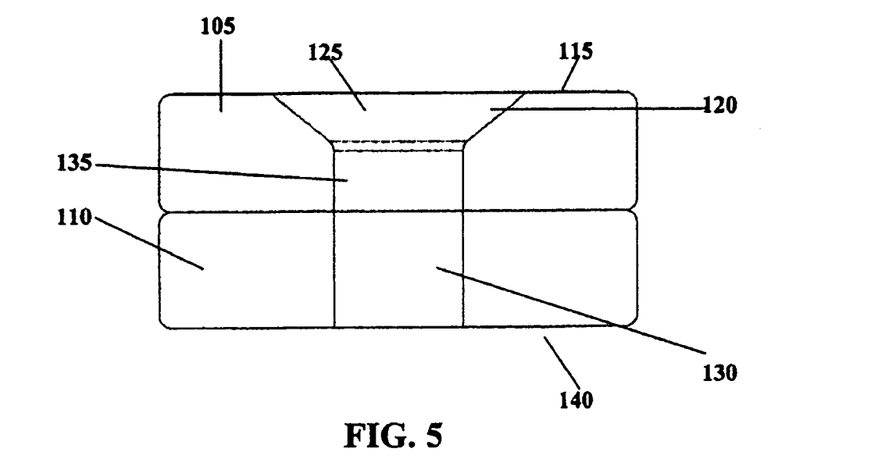
FIG. 5 illustrates a plurality of workpieces having aligned holes for installation of the fastener to secure the workpieces together.
Figure 6:
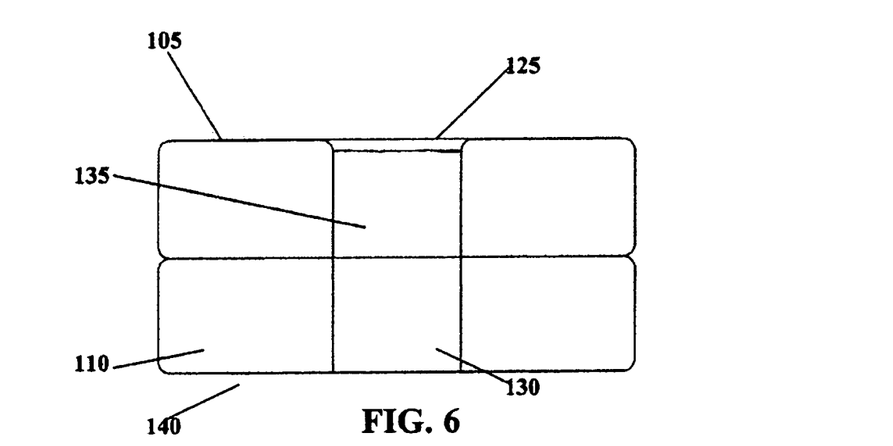
FIG. 6 illustrates a plurality of workpieces having aligned holes for installation of the fastener to secure the workpieces together, the outer portion of one of the workpieces having a countersink.

The workpieces 105, 110 have aligned holes 125, 130 is shown in FIGS. 5 and 6. The fastener assembly 10 extends through the aligned holes 125, 130 to secure the workpieces 105, 110. The outer surface of the workpieces 115 receive the enlarged head of the sleeve. As seen in the embodiment depicted in FIG. 6, the opening in the outer workpiece 105 terminates at its outer surface 115 in a countersink potion 120, or lead in radius portion, which is shaped to receive the enlarged flange 85 of the expansion sleeve member 20.

Figure 7:
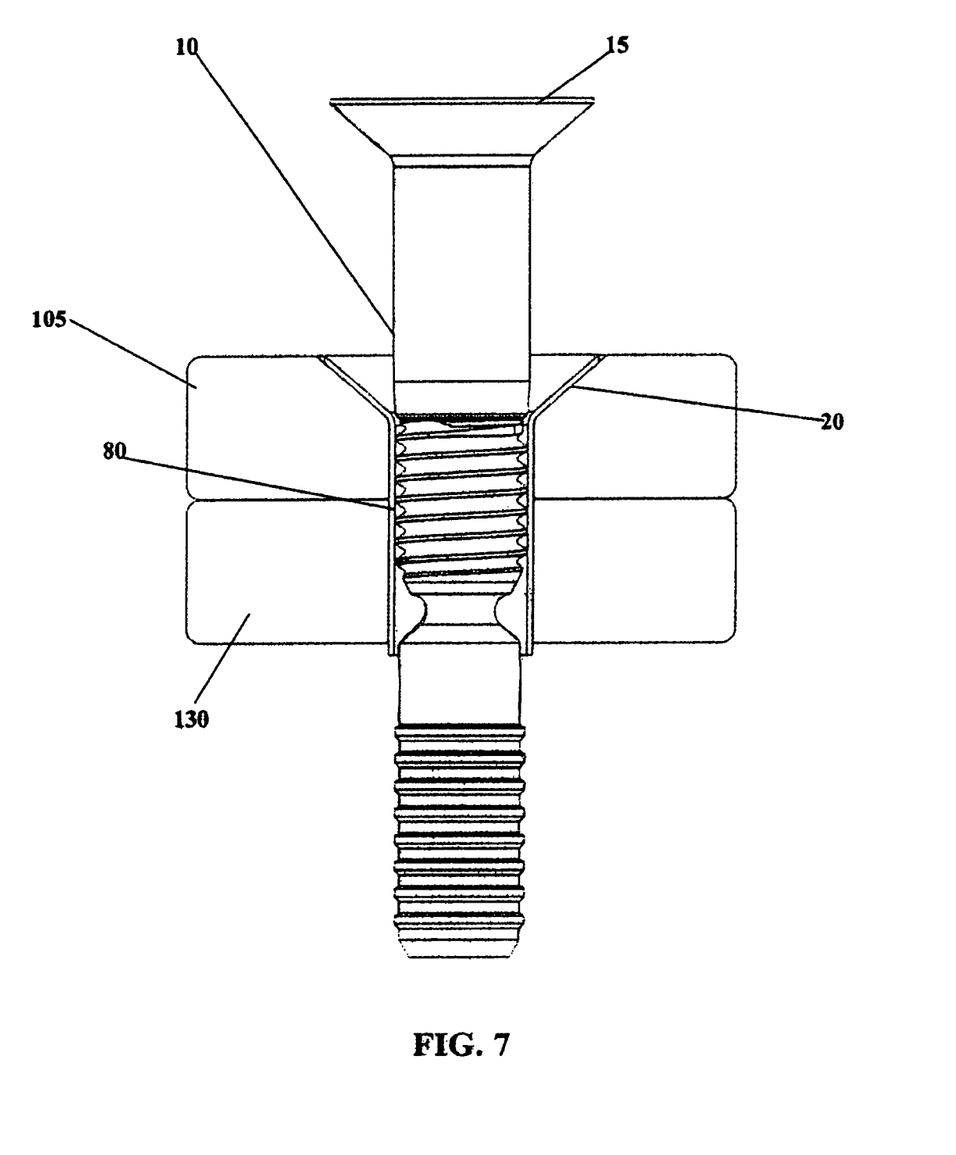
FIG. 7 illustrates the exemplary fastener before the pin has been pushed or pulled through the sleeve. The sleeve has not expanded and stretched to a desired interference fit.

The outer diameter of the sleeve tubular portion 80 before the pin member 15 is pushed or pulled into the sleeve member 20 is smaller than the diameter of the holes placed in the workpieces 105, 110. Accordingly, there is a space between the outer diameter of the sleeve and the inner diameter of the holes as shown in FIG. 7. The outside diameter of the sleeve tubular portion 80, in its pre-expanded state, and the diameter of the bores provide a slip fit when the tubular portion of the sleeve member 20 is located within the holes.

Figure 8:
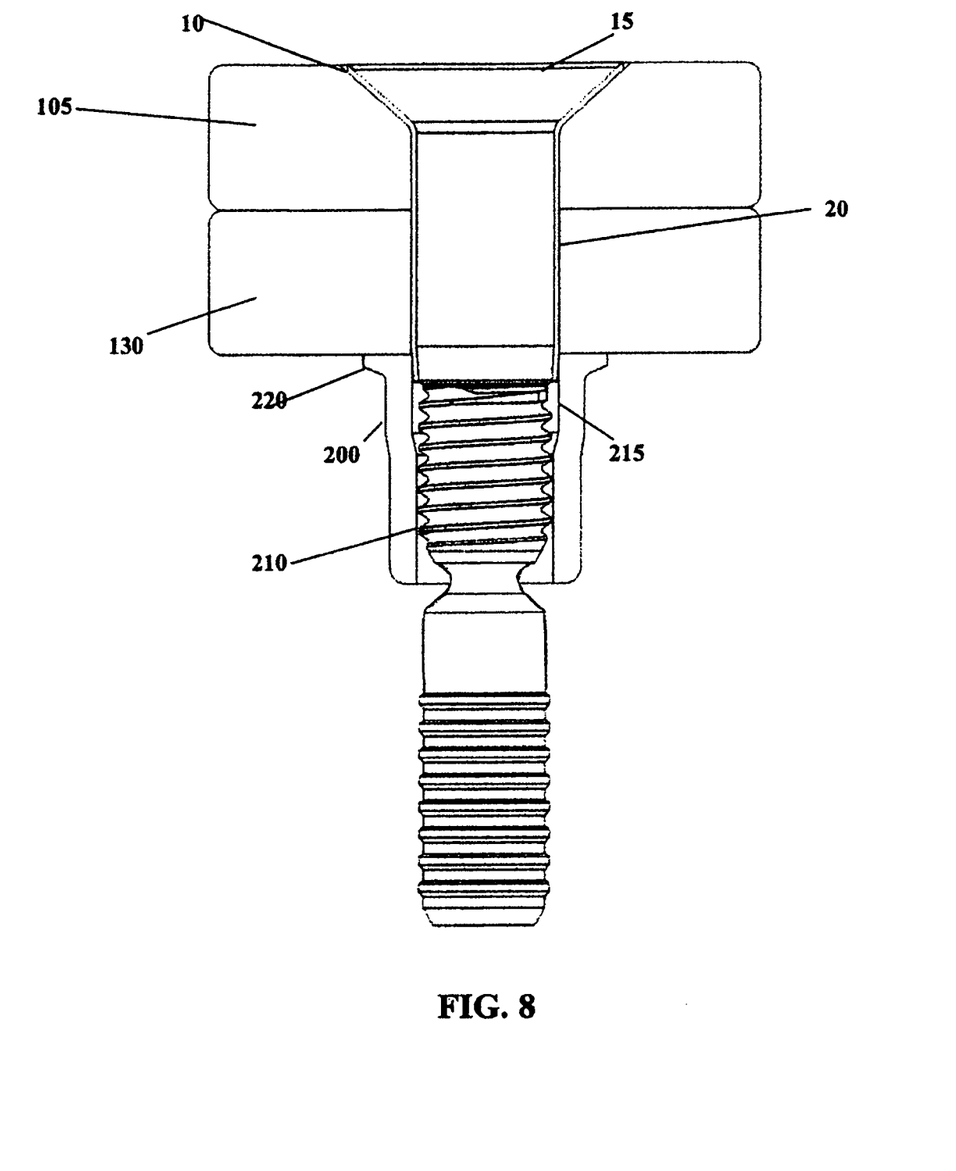
FIG. 8 illustrates the fastener after the pin has been pushed or pulled into position and also illustrates the collar placed onto the pin prior to swaging.

During installation, as the pin member 15 is pushed or pulled through the sleeve, the sleeve expands radially to a desired interference fit with the walls of the holes 125, 130 through workpieces 105, 110 as the pin shank portion is inserted into the sleeve member 20 as depicted in FIG. 8. In this manner, the sleeve member 20 is shielding the surfaces of the clearance holes from the pin shank portion, and thus, eliminating delamination of the plurality of workpieces as the pin is pushed or pulled into the sleeve member 20.

The tapered transition portion 55 is designed and optimized to minimize the installation force required for the high interference conditions resulting from the pin member 15 installation into the sleeve member 20. The transition portion 55 has a shallow lead-in angle that reduces the force that is needed for installation. Since less force is needed to install the fastener 10 into the interference condition, the fastener 10 allows for much longer grip lengths while diminishing sleeve stretch and premature sleeve failure.

In exemplary embodiments, the transition portion 55 may be tapered and have an angle of less than or equal to 20 degrees from the pin shank as the diameter decreases radially from the smooth shank portion to the thread portion. In the embodiment illustrated, the diameter of the transition portion 55 is tapered and decreases in a uniform fashion. However, the transition portion can be any shape as long as the radius of the pin shank decreases. For example, the transition portion could be a gentle radius decrease shaped as a convex curve, a concave curve or an s-shaped curve, or be in configuration that would allow a reduction in the radius between the smooth shank portion and the threaded portion of the pin. In these embodiments, the transition portion 55 reduces the radius of the pin shank between 0.004 to about 0.005 inches over a distance of 0.010 to 0.290 inches. In exemplary embodiments, the sleeve 20 radially expands between about 0.003 and 0.012 inches as the fastener is installed. In an exemplary embodiment, the interference of the fastener 10 with the workpieces 105, 110 is about 0.0005 to 0.0100 inches.

As a result of the fastener interference of the disclosed fastener 10, gaps between the fastener 10 and the workpiece structures are eliminated. Accordingly, good electrical conductivity between the components is provided. The potential for electrical sparks is reduced making the fastener 10 more safe for use in aerospace applications In exemplary embodiments, the surface of the outer diameter of the sleeve 20 and/or the inner diameter of the holes 125, 130 is rougher or coarser. By providing a rougher surface on these two areas, the coefficient of friction between the outer surface 95 of the sleeve member 20 and the inside diameter surface 135 of the holes 125, 130 is increased. Essentially the coefficient of friction and/or the force of pushing or pulling the pin 15 into the sleeve member 20 must be lower than the coefficient of friction and/or the load between the sleeve outer diameter surface 95 and the inner diameter surface 135 of the holes to provide the radial expansion of the tubular portion 80 of the sleeve 20. Without the differential coefficient of friction, the sleeve 20 may be pulled into the holes prior to installation.

In exemplary embodiments, the rougher outer surface of the sleeve and/or the inner surface of the holes combined with the lubrication on the inner surface 90 of the sleeve member 20 prevents the excessive stretching of the sleeve 20 during installation. The coefficient of friction between the outer surface 95 of the sleeve and inner surface 135 of the holes is greater than the coefficient of friction between the inner surface of the sleeve and the smooth cylindrical shank of the pin member. As a result, the sleeve 20 expands radially into the interference position and the stretching of the sleeve 20 is diminished.

In exemplary applications, the difference in the coefficient of friction will allow the stretching of the sleeve member 20 to be reduced to less than 0.050 inches. Additionally, the characteristics of the surfaces of the sleeve 20 allow for the use of sealant in the joint and on the fastener 10.

In exemplary embodiments, the optimized angled transition portion geometry 55 of the pin member 15 is designed to minimize the installation force necessary to install the fastener 10 into the interference conditions up to 0.010 inches. The geometry designed allows the force applied when inserting the pin to be applied perpendicular to the angled transition portion 55, instead of parallel to the insertion of the pin member 15 as with traditional bull-nose transition geometry. A lower force is needed to insert the pin member 15. As a result of the lower force required, the fastener 10 can be installed with a larger variety of workpieces, including metallic, composite and metallic/composite structures.

The transition geometry, the tapered transition portion 55, on the pin member 15 is also important as it allows functionality with much longer grip lengths without excessive sleeve stretch and/or premature sleeve failure.

To fully clamp the workpieces together, a clamping means is utilized. The clamping means could be either the threaded nut member 250 depicted in FIG. 3 or the collar member 200 illustrated in FIG. 8. Other clamping means may also be utilized to secure the workpieces together.

In one embodiment, a symmetrically shaped, tubular collar 200 of a pre-selected material is placed over the installed pin and sleeve assembly 12 as illustrated in FIG. 8. As the workpieces 105, 110 are secured together, the collar will be in radial alignment with the threaded portion of the pin member 15. The collar 200 has a counterbore portion 215 that is adapted to be located over the pin shank and a collar through bore, the inner diameter of the through bore 210 being selected to provide clearance to the pull grooves 75 and threaded portion 50 of the pin 15. The collar geometry is volume balanced. Significantly, the wall thickness of the collar 200 is uniform and symmetrically shaped for swaging into the threaded portion 50 to provide the desired clamp load.

As illustrated in FIG. 3, another embodiment of the fastener 10 utilizes a nut member 250 to secure the workpieces together. The nut member 250 includes a threaded portion 255 to mate with the threaded portion 50 of the pin member.

Both the collar member 200 or nut member 250 has a counterbore portion 215 at one end that allows the collar 200 or nut 250 to clear the sleeve component 20. Thus, the counterbore portion 215 has a diameter greater than the outer diameter of the sleeve 20. As a result, the installed fastener 10 has a reduced height and weight. This makes the fastener 10 a much more cost-effective solution than previous fasteners.

Both the collar 200 or nut member 250 also include an enlarged flange 220 at one end. The flange 220, being in engagement with the outer surfaces 140 of the plurality of workpieces, is provided to have a predetermined area of engagement in order to distribute the installation and final clamp loads on the outer surfaces 140 of the workpieces 105, 110. When the workpieces 105, 110 include at least one composite material, the engagement area of the flange 220 is selected to be sufficient to resist localized delamination or crushing of the composite material at the outer surfaces of the workpieces 105, 110.

Figure 9:
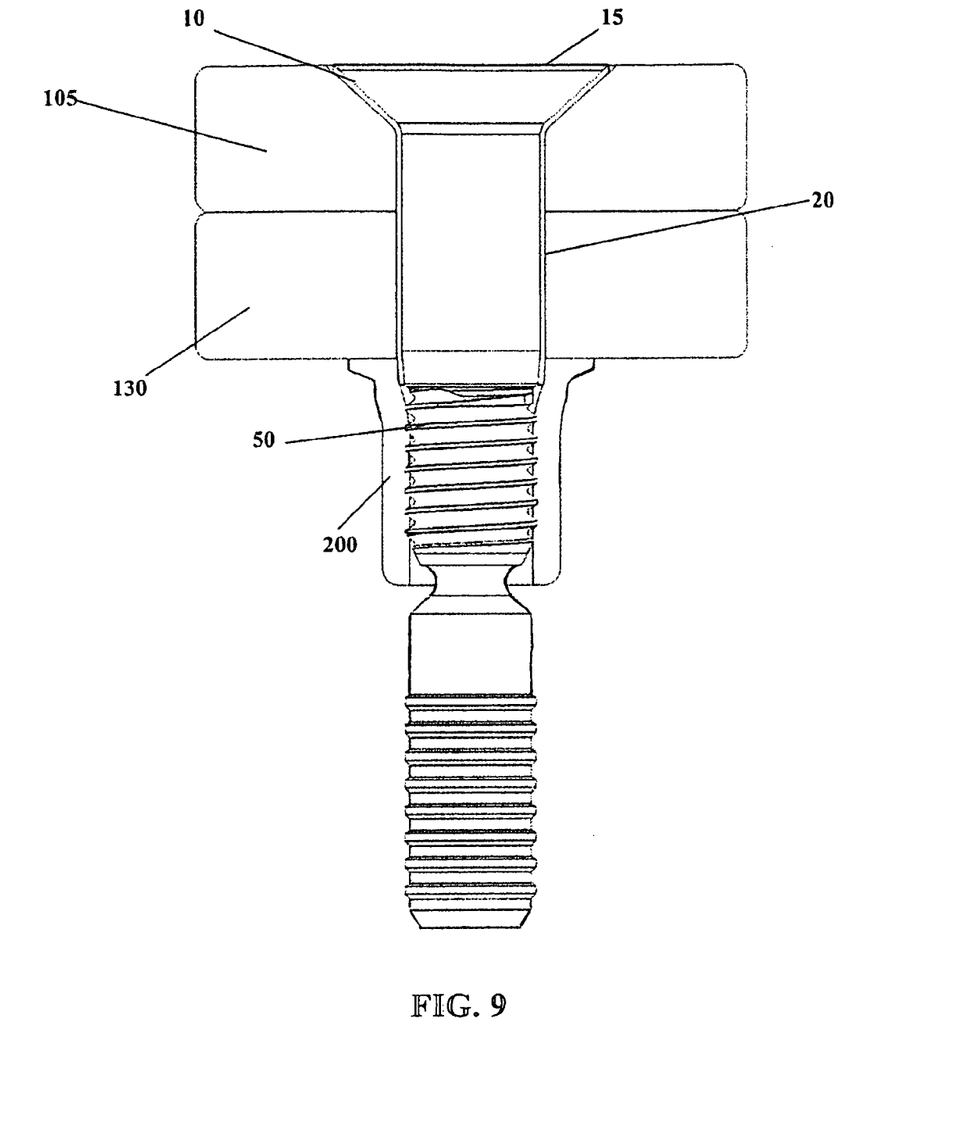
FIG. 9 illustrates the fastener with the collar swaged onto the threaded portion of the pin to secure the fastener prior to pintail separation.
Figure 10:
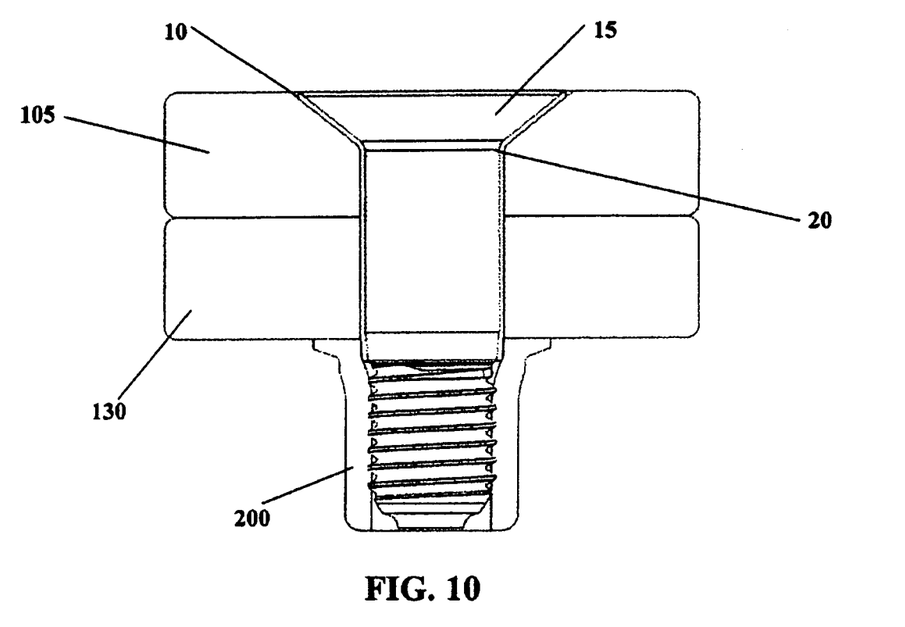
FIG. 10 illustrates the fastener in an engaged, installed position, after pintail separation.

The collar member of the fastener 10 is swaged to the threaded portion of the pin member 15 as shown in FIG. 9. In particular embodiments, the optimized collar geometry balanced with the existing thread forms and installation tools to allow swaging of the collar into the threaded portion 50. The collar 200 may be swaged into about 40 to 60% of the depth of the threads 50 while maintaining control of the collar material and achieving a consistent high, clamp load/preload.

A consistent, high fastener 10 clamp significantly increases the dynamic joint performance and life of the aircraft structure. In particular embodiments, the high clamp/preload averages about 50 to 96% of the minimum tensile strength of the installed fastener. In more exemplary embodiments, the high clamp/preload averages about 78% of the minimum tensile strength. In typical fasteners, the high clamp/preload averages only about 50% of the minimum tensile strength.

Additionally, the controlled, partial fill of the threaded portion 50 of the pin member 15 allows for significant and even sealant flowout during installation. The mechanical performance of the fastener 10 is not reduced with this sealant flowout.

The controlled, swaged fill by the collar 200 is also an improvement compared to prior art fasteners. In typical applications, there is an inherent gap between the internal and external threads of the pin member and the collar or nut. In addition, the non-pressure side of the fastener 10 and the counterbores of the collar or nut has gaps between the components. The fastener 10 disclosed herein creates full contact on both sides of the threaded portion 50 of the pin 15, eliminating gaps. Accordingly, the fastener has better conductivity and provides a safer fastener for aerospace conditions, in addition to improving fuel tightness.

When the collar 200 is swaged, it is swaged over the end portion of the sleeve member 20. As a result, the sleeve member 20 is compressed over the transition angle portion 55 of the pin 15. Accordingly, the sleeve 20 and pin 15 can then be removed as a single unit if necessary. This improves the efficiency and workability of the fastener 10 installed in various applications while also improving conductivity.

An exemplary implementation of the installed fastener 10 is illustrated in FIG. 9. The fastener 10, with the pin having a shank of predetermined length can be selected to fasten the plurality of workpieces 105, 110 having a grip varying in total thickness from a minimum to a maximum total thickness. Since it is desirable to have the sleeve encompass the entire grip length, the sleeve is predetermined to have a length no less than the maximum total width of the plurality of workpieces 105, 110.

For particular applications of the disclosed fastener, 110% of minimum mechanical performance is achieved with a functional grip capability of about 0.136 inches. Typical fasteners only have a functional grip capability of about 0.062 inches. Having a longer functional grip capability variance provides the fastener 10 with more versatility to be used with different applications.

To install the fastener 10, the sleeve is placed onto the pin as is depicted in FIG. 1. The sleeve 20 and pin 15 is then placed into the aligned holes of the workpieces 105, 110 so that a sufficient length of the frangible portion of the pin 15 extends beyond the outer surface of the plurality of workpieces 105, 110 such that the tool can grip the pull grooves 75 of the pin member 15 for pull-in capability.

As the pin member 15 is pulled by the tool, the smooth cylindrical shank portion 45 of the pin member 15 will be pulled into the sleeve member 20 causing the sleeve 20 to expand radially outward. The magnitude of this expansion is a function of the friction and force required between the smooth cylindrical shank pin portion 45 and the inner diameter surface 90 of the sleeve and the friction and force between the outer diameter of the sleeve 95 and the inner diameter of the holes 135 in the plurality of workpieces 105, 110.

Then the collar member 200 is placed over the pin member 15 and sleeve 20 so that the flange portion 220 sits against the workpiece surface 140. At this point, a swaging tool is utilized to swage the collar member 200 onto the threaded portion 50 of the pin member, locking the fastener 10 into place.

In another embodiment, to install the fastener 10, the sleeve is placed onto the pin as is depicted in FIG. 3. The sleeve 20 and pin 15 is then placed into the aligned holes of the workpieces 105, 110. The pin 15 is pushed into the sleeve 20 so that a sufficient length of the threaded portion of the pin 15 extends beyond the outer surface of the plurality of workpieces 105, 110 such that the threaded portion of the nut 250 can mate with the threaded portion of the pin. The nut 250 is then installed and tightened to finalize the installation.

Thus, a unique fastener 10 is disclosed providing an interference fit within composite, metallic, and metallic/composite structures. The fastener 10 provides an improved dynamic joint performance as a result of better fastener interference and higher clamp loads. The geometry of the various components allows for the interference conditions while eliminating delamination and potential structural failure. The interference eliminates gaps between the fastener 10 and the structure, providing good electrical conductivity and reducing the potential for electrical sparks, increasing the safety of the structure 10.

While the above description contains many particulars, these should not be considered limitations on the scope of the disclosure, but rather a demonstration of embodiments thereof. The fastener and uses disclosed herein include any combination of the different species or embodiments disclosed. Accordingly, it is not intended that the scope of the disclosure in any way be limited by the above description. The various elements of the claims and claims themselves may be combined any combination, in accordance with the teachings of the present disclosure, which includes the claims.

What is claimed is:

1. A sleeve interference fastener adapted to be installed in a hole of a structure comprising:
   a) a sleeve having a flared head at one end and a tubular portion, the tubular portion having an inner diameter and an outer diameter, wherein the outer diameter of the tubular portion is less than an inner diameter of the hole of the structure and wherein a surface of the inner diameter of the tubular portion comprises a low friction coating;
   b) a pin member having a protruding pin head at one end, a locking portion at an opposite end, and a shank portion therein between, and the shank portion, located below the protruding pin head, has a diameter greater than the inner diameter of the tubular portion of the sleeve; and
   c) a tubular locking member adapted to fit over the locking portion of the pin member;
   d) the structure comprises a composite material and having the hole, wherein the inner diameter of the hole includes a sealant;
   e) wherein the sleeve is adapted to expand radially over the shank portion to form an interference fit between the outer diameter of the sleeve and the hole of the structure so as to provide an installed position; and
   f) wherein, in the installed position, the low friction coating covers a shank contact surface of the surface of the inner diameter of the sleeve and wherein the shank contact surface is defined when the pin member is installed within the sleeve, adapted to result in:
   (i) a coefficient of friction between the shank contact surface of the surface of the inner diameter of the sleeve and the shank portion of the pin member having X,
   (ii) a coefficient of friction between a surface of the outer diameter of the sleeve and the inner diameter of the hole of the structure having Y, and
   (iii) wherein X is consistently maintained less than Y when the shank portion is moved within the sleeve.

2. The sleeve interference fastener of claim 1, wherein the pin includes a tapered transition portion having an angle less than about 20 degrees from the shank portion as the diameter decreases radially from the shank portion to the locking portion.

3. The sleeve interference fastener of claim 1, wherein the tubular locking member is a collar.

4. The sleeve interference fastener of claim 3, wherein the tubular locking member comprises a counterbore portion, wherein the counterbore portion is adapted to fit over the locking portion of the pin member and compress the sleeve around the pin member.

5. The sleeve interference fastener of claim 1, wherein the interference fit of the fastener with the structure is about 0.0005 to about 0.0100 inches.

6. The sleeve interference fastener of claim 1, wherein the shank portion of the pin member is cylindrical.

7. The sleeve interference fastener of claim 1, wherein the structure is a metallic/composite structure.

8. A sleeve interference fastener adapted to be installed in a hole of a structure comprising:
   a) a sleeve having a flared head at one end and a tubular portion, the tubular portion having an inner diameter and an outer diameter, wherein the outer diameter of the tubular portion is less than an inner diameter of the hole of the structure and wherein a surface of the inner diameter of the tubular portion comprises a low friction coating;
   b) a pin member having a countersink pin head at one end, a locking portion at an opposite end, and a shank portion therein between, and the shank portion, located below the countersink pin head, has a diameter greater than the inner diameter of the tubular portion of the sleeve; and
   c) a tubular locking member adapted to fit over the locking portion of the pin member;
   d) the structure comprises a composite material and having the hole, wherein the inner diameter of the hole includes a sealant;
   e) wherein the sleeve is adapted to expand radially over the shank portion to form an interference fit between the outer diameter of the sleeve and the hole of the structure so as to provide an installed position; and
   f) wherein, in the installed position, the low friction coating covers a shank contact surface of the surface of the inner diameter of the sleeve and wherein the shank contact surface is defined when the pin member is installed within the sleeve, adapted to result in:
   (i) a coefficient of friction between the shank contact surface of the surface of the inner diameter of the sleeve and the shank portion of the pin member having X,
   (ii) a coefficient of friction between a surface of the outer diameter of the sleeve and the inner diameter of the hole of the structure having Y, and
   (iii) wherein X is consistently maintained less than Y when the shank portion is moved within the sleeve.

9. The sleeve interference fastener of claim 8, wherein the pin includes a tapered transition portion having an angle less than about 20degrees from the shank portion as the diameter decreases radially from the shank portion to the locking portion.

10. The sleeve interference fastener of claim 8, wherein the tubular locking member is a collar.

11. The sleeve interference fastener of claim 10, wherein the tubular locking member comprises a counterbore portion, wherein the counterbore portion is adapted to fit over the locking portion of the pin member and compress the sleeve around the pin member.

12. The sleeve interference fastener of claim 8, wherein the interference fit of the fastener with the structure is about 0.0005 to about 0.0100 inches.

13. The sleeve interference fastener of claim 8, wherein the shank portion of the pin member is cylindrical.

14. The sleeve interference fastener of claim 8, wherein the structure is a metallic/composite structure.

* * * * *

UNITED STATES PATENT AND TRADEMARK OFFICE
CERTIFICATE OF CORRECTION

PATENT NO. : 8,573,910 B2  Page 1 of 1
APPLICATION NO. : 12/732396
DATED : November 5, 2013
INVENTOR(S) : Michael U. March and Oviedo Arciniega It is certified that error appears in the above-identified patent and that said Letters Patent is hereby corrected as shown below:

In the Specifications

Column 2, line 36, delete "treaded" and insert --threaded.--

Signed and Sealed this
Fourth Day of March, 2014

Michelle K. Lee
*Deputy Director of the United States Patent and Trademark Office*